United States Patent [19]
Bull

[11] Patent Number: 5,029,418
[45] Date of Patent: Jul. 9, 1991

[54] SAWING METHOD FOR SUBSTRATE CUTTING OPERATIONS

[75] Inventor: David N. Bull, Brockport, N.Y.

[73] Assignee: Eastman Kodak Company, Rochester, N.Y.

[21] Appl. No.: 488,178

[22] Filed: Mar. 5, 1990

[51] Int. Cl.[5] .......... B23C 1/00; B23Q 3/00
[52] U.S. Cl. .......... 51/281 R; 51/235
[58] Field of Search .......... 51/235, 216 R, 216 LP, 51/216 T, 283 R, 281 R, 323, 401

[56] References Cited

U.S. PATENT DOCUMENTS

| | | | |
|---|---|---|---|
| 1,945,493 | 1/1934 | Martindell | 248/39 |
| 2,443,987 | 6/1948 | Morrison et al. | 90/59 |
| 2,762,954 | 9/1956 | Leifer | 317/235 |
| 2,970,730 | 2/1961 | Schwarz | 225/2 |
| 3,040,489 | 6/1962 | Da Costa | 53/21 |
| 3,206,088 | 9/1965 | Meyer et al. | 225/2 |
| 3,461,537 | 8/1969 | Lotz | 29/413 |
| 3,537,169 | 11/1970 | Eigeman et al. | 29/413 |
| 3,562,057 | 2/1971 | McAlister | 156/300 |
| 3,677,875 | 7/1972 | Althouse | 161/117 |
| 3,711,082 | 1/1973 | Seidenfaden | 51/235 |
| 3,729,206 | 4/1973 | Cachon et al. | 279/3 |
| 3,766,638 | 10/1973 | Moore | 29/583 |
| 3,918,150 | 11/1975 | Gantley | 29/583 |
| 3,955,163 | 5/1976 | Novak | 355/132 |
| 4,006,909 | 2/1977 | Ollendorf et al. | 279/3 |
| 4,034,517 | 7/1977 | Weatherell | 51/235 |
| 4,296,542 | 10/1981 | Gotman | 29/574 |
| 4,506,184 | 3/1985 | Siddall | 310/328 |
| 4,625,463 | 12/1986 | Sekiya | 51/235 |
| 4,693,036 | 9/1987 | Mori | 51/235 |
| 4,724,222 | 2/1988 | Feldman | 437/173 |
| 4,808,046 | 2/1989 | Pilkington | 51/235 |

FOREIGN PATENT DOCUMENTS

| | | | |
|---|---|---|---|
| 155494 | 6/1976 | Japan | 51/235 |
| 662962 | 8/1979 | U.S.S.R. | 51/235 |

*Primary Examiner*—Frederick R. Schmidt
*Assistant Examiner*—Blynn Shideler
*Attorney, Agent, or Firm*—Raymond L. Owens

[57] ABSTRACT

A technique for sawing substrates on a chuck wherein the substrate is secured to a layer of a first sawing tape, and is placed on the major surface of a chuck with a second tape therebetween. The second tape comprises both a first major surface with a low surface tension effect that is in contact with the major surface of the chuck, and a multitude of perforations or pinholes therein. Vacuum is applied to both the channels in the major surface of the chuck and the pinholes in the second tape, to securely hole the substrate to the chuck during the sawing of the substrate. When the sawing is completed, the vacuum is removed and either atmospheric pressure or pressurized air is applied to the channels of the chuck, and the combination of the substrate, first sawing tape and second tape are easily removable because of the low surface tension effect of the first major surface of the second tape with the major surface of the chuck.

15 Claims, 2 Drawing Sheets

SAWING METHOD FOR SUBSTRATE CUTTING OPERATIONS

FIELD OF THE INVENTION

The present invention relates to an improved technique for substrate sawing operations to provide reduced yield losses due to edge chipping caused by the cutting and separating operation on substrates such as, for example, semiconductor or glass wafers.

BACKGROUND OF THE INVENTION

Semiconductor devices are obtained from processed wafers by various methods. One such method is performed by (a) securing one or more wafers on an adhesively coated layer of material, (b) scribing the appropriate matrix of lines on each wafer, and then (c) breaking the scribed lines by moving a weighted roller over each wafer. In this regard see, for example, U.S. Pat. Nos. 3,040,489 (issued to H. Da Costa on June 26, 1962) and 3,206,088 (issued to A. Meyer et al. on Sept. 14, 1965). Various other methods can then be used to separate the individual devices using plungers, air pressure and the like to expand the adhesively coated layer and spread the broken lines. In this regard see, for example, U.S. Pat. Nos. 3,562,057 (issued to K. W. McAlister et al. on Feb. 9, 1971) and 4,296,542 (issued to A. Gotman on Oct. 27, 1981.)

Another method for obtaining semiconductor devices from a wafer is shown in FIG. 1 by sawing completely through a wafer 10 in orthogonal directions with a saw 11 after the wafer 10 has been mounted on a thin tape 12 or adhesive material within a frame 13 that is held on a saw chuck 14 by vacuum introduced through holes and channels 15. In this regard see, for example, U.S. Pat. Nos. 2,762,954 (issued to M. Liefer on Sept. 11, 1956). There, a semiconductor wafer is securely mounted to a plate with a thin adhesive layer of pitch or the like. A saw then cuts through the wafer and partially into the adhesive layer. The resulting semiconductor devices are then further processed or removed from the plate.

In general, when a tape layer 12 is used to secure the wafer 10, and the sawing operation is finished to form semiconductor devices 16, the vacuum on the saw chuck 14 is switched off, and air is forced through holes and channels 15 in chuck 14 and under the tape 12, as shown in FIGS. 2 and 3, in order to break the seal between an upper surface 17 of chuck 14 and the tape 12. This seal is usually enhanced by surface tension of water used for the cutting operation that becomes trapped between the chuck 14 and the tape 12. Because of such enhanced surface tension, sections of tape 12 release at different times when air pressure is applied as shown in FIG. 2, or do not release at all until pressure is applied to frame 13, either manually or by an automatic handler. This sectional releasing results in rejectable chipping to the edges of the semiconductor devices 16 as the devices 16 are tilted in relation to each other and the top edges clash together as shown in FIG. 2. If it were possible to release all of tape 12 at the same time, tape 12 would become domed and the die prevented from touching each other as shown in FIG. 3.

Attempts have been made to solve this problem by altering the design of the top surface 17 of vacuum chuck 14. Some chucks 14 have a roughened surface so that surface tension effects are not as severe, while others have many fine circular, or other configuration, channels connected to each other so that the air pressure will release all areas at the same time, as shown, for example, in FIGs. 1 or 7 in U.S. Pat. No. 2,443,983 (issued to C. Morrison et al. on June 22, 1948) or FIG. 1 of U.S. Pat. No. 4,506,184 (issued to G. J. Siddall on Mar. 19, 1985). However, these approaches do not consistently solve the problem and the situation becomes even worse as device 16 sizes become larger. When one area of the tape 12 separates from the chuck 14, the air escapes through that section and the remainder of the tape 12 is still held on chuck 14. Roughening the sawing tape 12 to reduce the surface tension also does not provide a solution since, when the wafer 10 is mounted to a roughened tape 12 under the influence of heat and pressure, the roughening tends to be removed from the tape 12. Furthermore, if the roughening of tape 12 is not totally removed, then the wafer 10 is not held as firmly as required. Therefore, the problem still remains to provide a technique for ensuring the concurrent release of the tape 12 from the entire upper surface 17 of the chuck 14.

SUMMARY OF THE INVENTION

The present invention is directed to an improved technique for sawing substrates, and, more particularly, to a technique which securely holds a substrate to be sawed on a layer of a sawing tape on a vacuum chuck, and still provides a low surface tension effect for release of the sawing tape and substrate from a vacuum chuck after the sawing process is completed.

In accordance with an embodiment of the present invention, a substrate or wafer is adhesively mounted on a first major surface of a sawing tape within a frame and then an other opposing major surface of the sawing tape is placed on a tape insert disposed on the top of a vacuum chuck. The tape insert comprises a multitude of spaced-apart pinholes or perforations thereover, and a first major surface that contacts the upper surface of vacuum chuck having a low surface tension effect by the use of dimples, depressions, or any other configuration. Vacuum is then applied through the vacuum chuck to securely hold both the tape insert and the wafer on the sawing tape to the vacuum chuck, and the sawing process is performed. When the sawing operation is completed, the vacuum is released and at least atmospheric pressure is applied to permit the tape insert to be easily slid or removed from the chuck surface because of its low surface tension effect.

The invention will be better understood from the following more detailed description taken with the accompanying drawings and claims.

The drawings are not necessarily to scale.

DETAILED DESCRIPTION

Figure 4:
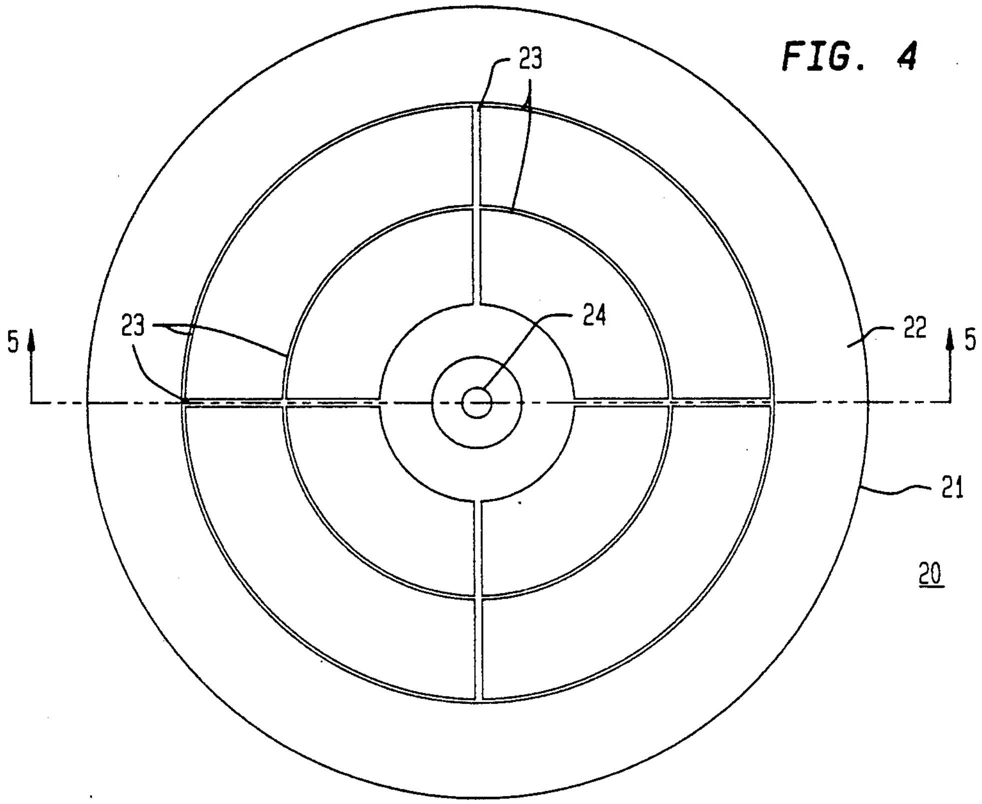
FIG. 4. shows a top view of a vacuum chuck that can be used in accordance with the present invention.
Figure 5:
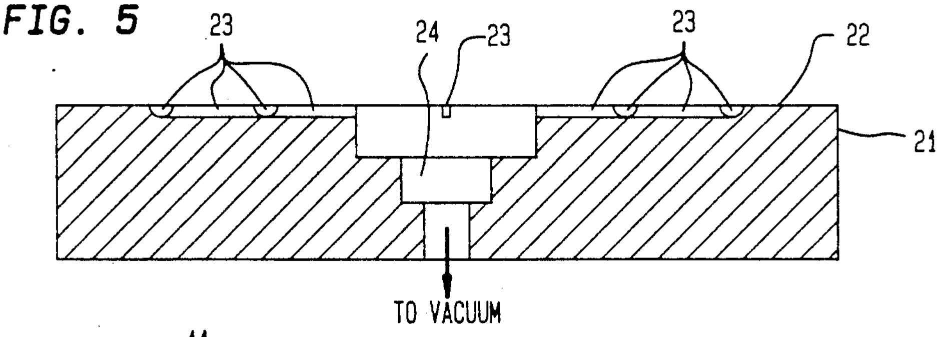
FIG. 5 shows a cross-sectional view of the vacuum chuck of FIG. 4 through a dashed line 5—5.

Referring now to FIGS. 4 and 5, there are shown a top view and a cross-sectional, respectively, of a vacuum chuck 20 in accordance with the present invention. The cross-sectional view of FIG. 5 is taken through a dashed line 5—5 of FIG. 4. Vacuum chuck 20 comprises a plate 21 with a planar upper surface 22 that includes circular and radial channels 23. A central aperture (port) 24 through plate 21 is used to supply either vacuum, from a vacuum source (not shown), or atmospheric pressure to the channels 23 in the upper surface of plate 21. Although port 24 is shown as a stepped arrangement, it is to be understood that any shaped port configuration, such as tapering, can be used.

Figure 1:
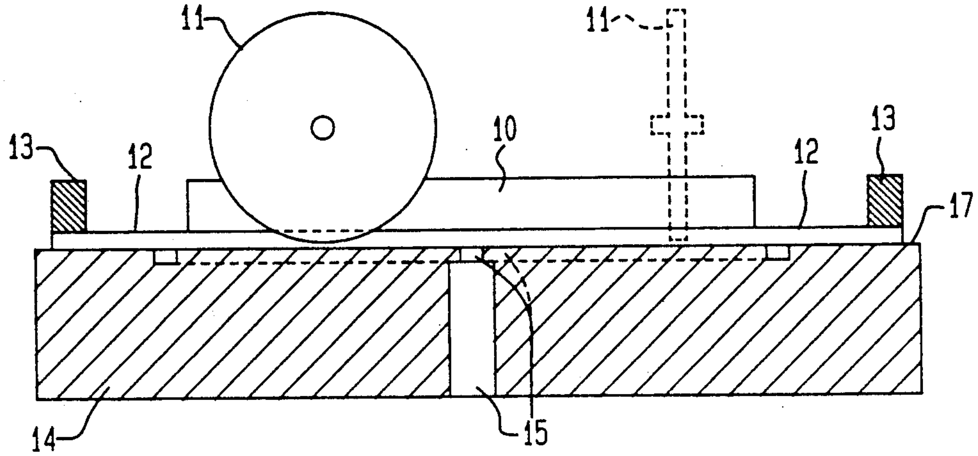
FIG. 1 (PRIOR ART)
FIG. 1 is a side cross-sectional view of a prior art substrate sawing arrangement.
Figure 6:
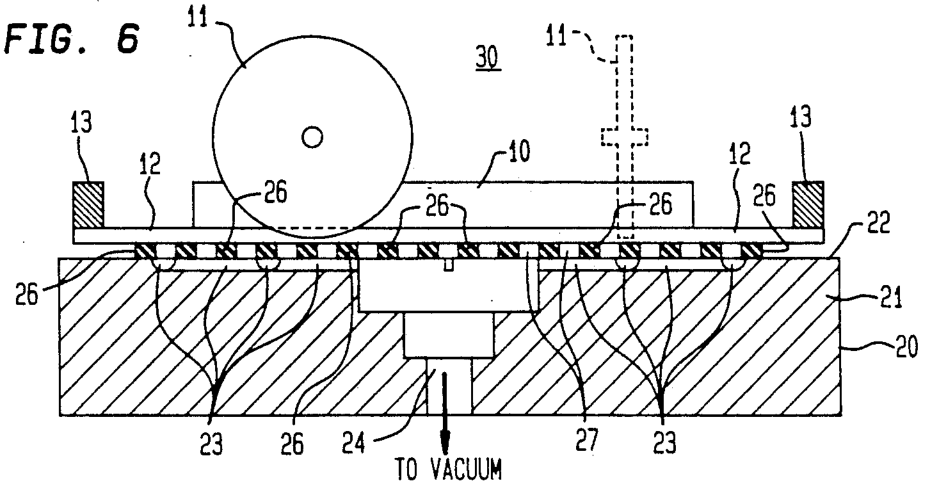
FIG. 6 shows a cross-sectional view of substrate sawing apparatus which uses the vacuum chuck of FIGS. 4 and 5 and is in accordance with the present invention.

Referring now to FIG. 6, there is shown sawing apparatus 30 in accordance with the present invention. Sawing apparatus 30 is shown with a substrate 10 (e.g., a semiconductor wafer) being sawed apart thereon. The apparatus 30 comprises the vacuum chuck 20 (as shown in FIGS. 4 and 5), a first (sawing) tape 12 and a second tape 26. The substrate 10 is adhesively secured to the first tape 12 in a frame 13 in essentially the same manner as is shown in FIG. 1. However, instead of substrate 10, tape 12 and frame 13 being placed directly on planar surface 22 of vacuum chuck 20 as shown in FIG. 1, the second tape 26 is placed between tape 12 and the planar upper surface of vacuum chuck 20. The first tape 12 can comprise any suitable material, as , for example, a polyvinylchloride material.

The second tape 26 comprises a low surface tension major surface disposed against the upper surface 22 of vacuum chuck 20. Such low surface tension is achieved by forming, for example, a multitude of dimples, depressions or any other configurations (not shown) in the major surface of the second tape 26. Additionally, a multitude of pinholes or perforations 27 are provided throughout the tape insert 26 to permit vacuum, atmospheric pressure or pressurized air introduced to port 24 of vacuum chuck 20 to extend through the second tape 26 and secure sawing tape 12 to the top of the second tape 26. The second tape 26 is preferably of a thickness of, for example, 0.001 inches, and cut to a size which is larger than substrate 10 but smaller than the internal size of tape mounting frame 13.

Figure 2:
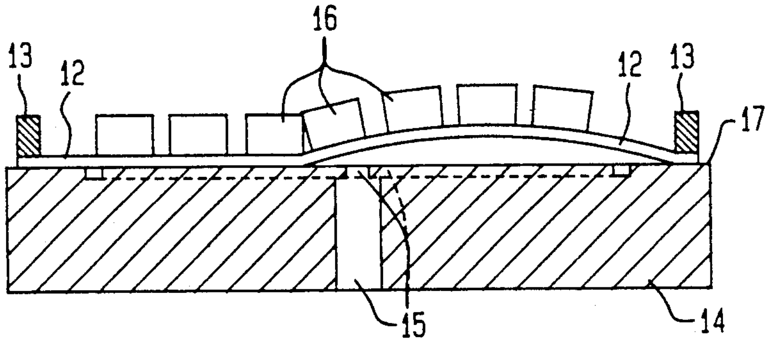
FIG. 2 (PRIOR ART)
FIG. 2 is a side cross-sectional view of the prior art substrate sawing arrangement of FIG. 1 after the substrate has been sawed and air pressure supplied under the substrate.

In operation, when substrate 10, tape 12 and tape insert 26 have been placed on the vacuum chuck 20 as shown in FIG. 6, vacuum is applied to port 24 and distributed under the dimpled second tape 26 via channels 23 and then via pinholes 27 in dimpled tape insert 26 to hold the first tape 12 and substrate 10 securely on vacuum chuck 20. The sawing operation of substrate 10 is then performed with a saw 11 to produce devices [e.g., semiconductor chips (not shown)]like devices 16 in FIGS. 1 and 2. Once the sawing of substrate 10 has been completed, the vacuum applied to port 24 is stopped, and port 24 is opened to atmospheric pressure.

Figure 3:
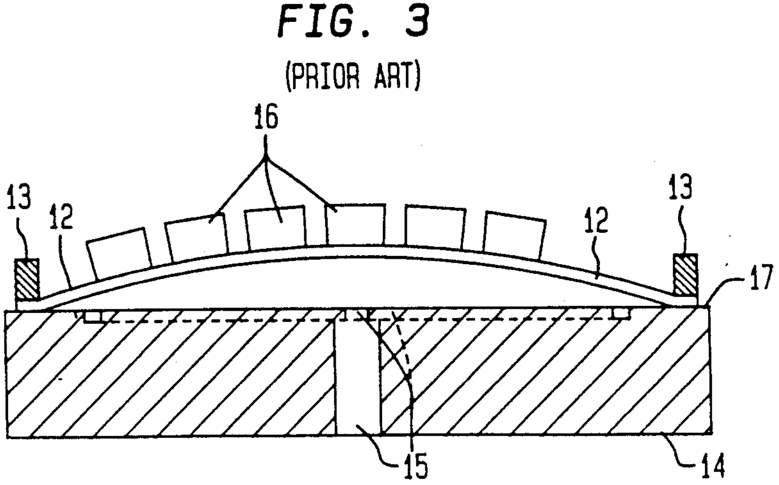
FIG. 3 (PRIOR ART)
FIG. 3 is cross-sectional view of a substrate sawing arrangement similar to FIG. 1 and FIG. 2, showing what could happen if the surface tension of the substrate tape were reduced and pressurized air applied to the chuck.

Since the major surface of the second tape 26 in contact with upper surface 22 of vacuum chuck 20 has a very low surface tension effect, the second tape 26 with frame 13 and the first tape 12 with the substrate 10 thereon may be easily slipped off of the vacuum chuck 20. Alternatively, the second tape 26 and the substrate 10 on the first tape 12 and frame 13 may be lifted off of the vacuum chuck 20 with an automatic handler (not shown) after the atmospheric pressure, or preferably pressurized air, is applied to the port 24 and the channels 23 in the vacuum chuck 20. The pressurized air is effective since it causes the complete substrate 10, with the first tape 12, to be lifted in a single action to produce the doming effect as shown in FIG. 3. The dimpled and perforated second tape 26 may then be easily peeled off the back of the first tape 12 if necessary. The use of the dimpled and perforated second tape 26 in accordance with the present invention reduces surface tension effects on the first tape 12 and hence reduces yield losses due to edge chipping on devices (not shown) when such doming effect is used.

It is to be understood that the specific embodiments described herein are intended merely to be illustrative of the spirit and scope of the present invention. Modifications can readily be made by those skilled in the art consistent with the principles of this invention. For example, it is to be understood that substrate 10 can comprise any material such as a semiconductor wafer, or a dielectric material such as, for example, glass. Additionally, it is to be understood that the major surface 22 of chuck 20 need not be planar and can comprise any configuration such as a dish or any suitable configuration as found in the prior art, since the first (sawing) tape 12 and the second tape 26 can be flexible to conform to any shape. Additionally, the second tape 26 can comprise for example, a polyethylene layer or any suitable layer of material having the characteristics described herein before such as a roughened or dimpled surface or one or both sides.

What is claimed is:

1. Apparatus for sawing a substrate comprising:

a chuck comprising a major surface with channels therein which are adapted to be coupled to a source of vacuum, atmospheric pressure or pressurized air;

a first layer of a flexible material comprising a first major surface, a second opposing major surface, and means on said first major surface for securely holding the substrate when placed thereon; and a second layer of material disposed between, and in contact with, both the second opposing major surface of the first layer of material and the major surface of the chuck, the second layer of material comprising a first major surface arranged to have relatively low surface tension when placed in contact with the major surface of the chuck whereby the second layer provides for easy release of the first layer when a vacuum is released from the chuck.

2. The apparatus of claim 1 wherein the first major surface of the second layer of material comprises a roughened surface with a low surface tension effect.

3. The apparatus of claim 1 wherein the second layer of material comprises small depressions or dimples disposed about said first major surface thereof.

4. The apparatus of claim 1 wherein the substrate is a semiconductor wafer.

5. The apparatus of claim 1 wherein the first major surface of the second layer of material comprises small spaced-apart pinholes or perforations disposed about said second layer of material to permit the vacuum, atmospheric pressure, or pressurized air to extend therethrough when in contact with the major surface of the chuck.

6. The apparatus of claim 5 wherein the first major surface of the second layer of material comprises a roughened surface with a low surface tension effect.

7. The apparatus of claim 5 wherein the second layer of material comprises small depressions or dimples disposed about said first major surface thereof.

8. The apparatus of claim 5 wherein the substrate is a semiconductor wafer.

9. A method of sawing a substrate on a major surface of a chuck comprising the steps of:

(a) securing the substrate on a first major surface of a first layer of a flexible material, where the first layer of material comprises first and second opposing major surfaces and means on said first major surface for securely holding the substrate thereon;

(b) placing a first major surface of a second layer of material in contact with the major surface of the chuck, the second layer of material comprising first and second opposing major surfaces and the first major surface of the second layer of material has relatively low surface tension when placed in contact with said major surface of the chuck whereby the second layer provides for easy release of the first layer when a vacuum is released from the chuck;

(c) placing the second major surfaces of each of the first and second layers of material in contact with each other;

(d) applying a vacuum to channels formed in the major surface of the chuck for holding the first and second layers of material to the major surface of the chuck; and (e) sawing the substrate in desired configurations.

10. The method of claim 9 wherein the first major surface of the second layer of material of step (b) comprises a roughened surface to provide a minimal surface tension effect.

11. The method of claim 9 wherein the second layer of material of step (b) comprises small depressions or dimples disposed about said first major surface thereof to provide a minimal surface tension effect when the first major surface of the second layer of material is in contact with the major surface of the chuck.

12. The method of claim 9 wherein the substrate to be sawed is a semiconductor wafer.

13. The method of claim 9 wherein the first major surface of the second layer of material of step (b) comprises small spaced-apart pinholes or perforations disposed about said second layer of material for permitting the vacuum of step (e) to extend therethrough when in contact with the major surface of the chuck.

14. The method of claim 9 further comprising the steps of:

(f) applying atmospheric pressure to the channels formed in the major surface of the chuck after the completion of step (e); and (g) removing the first and second layers of material with the sawed substrate thereon from the major surface of the chuck.

15. The method of claim 9 wherein the method comprises the further step of (f) applying pressurized air to the channels formed in the major surface of the chuck after the completion of step (e) while concurrently removing the first and second layers of material with the substrate thereon from the major surface of the chuck.

* * * * *